(12) United States Patent
Mendonsa et al.

(10) Patent No.: US 10,366,722 B1
(45) Date of Patent: Jul. 30, 2019

(54) LASER MODE HOP DETECTION IN A HEAT-ASSISTED MAGNETIC RECORDING DEVICE USING A SLIDER SENSOR AND LASER MODULATION

(71) Applicant: Seagate Technology LLC, Cupertino, CA (US)

(72) Inventors: Riyan Mendonsa, Minneapolis, MN (US); James Dillon Kiely, Edina, MN (US); Joshua Ward Christensen, Savage, MN (US); Jon D. Trantham, Chanhassen, MN (US); Chad Robert Barry, Bloomington, MN (US); Tim Rausch, Farmington, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/978,432

(22) Filed: May 14, 2018

Related U.S. Application Data

(60) Provisional application No. 62/506,048, filed on May 15, 2017.

(51) Int. Cl.
| | |
|---|---|
| *G11B 11/00* | (2006.01) |
| *G11B 7/1263* | (2012.01) |
| *G11B 5/00* | (2006.01) |
| *G11B 7/1267* | (2012.01) |
| *G11B 5/60* | (2006.01) |
| *G11B 7/126* | (2012.01) |

(52) U.S. Cl.
CPC .......... *G11B 7/1263* (2013.01); *G11B 5/6088* (2013.01); *G11B 7/126* (2013.01); *G11B 7/1267* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,127,015 A | * | 6/1992 | Chikugawa | H01S 5/06835 372/29.01 |
| 5,767,704 A | * | 6/1998 | Larson | H01S 5/042 327/109 |
| 8,908,481 B1 | * | 12/2014 | Miyamoto | G11B 5/314 369/13.33 |
| 9,135,937 B1 | * | 9/2015 | Goulakov | H01S 5/06804 |
| 9,153,276 B2 | | 10/2015 | Johnson et al. | |
| 9,202,499 B2 | | 12/2015 | Kiely et al. | |
| 9,536,555 B1 | * | 1/2017 | Duda | G11B 5/6076 |

(Continued)

*Primary Examiner* — Tan X Dinh
(74) *Attorney, Agent, or Firm* — Hollingsworth Davis, LLC

(57) ABSTRACT

An apparatus comprises a laser diode configured to generate modulated light during a write operation in response to receiving modulated current having a mean amplitude that varies or is constant. A slider is configured for heat-assisted magnetic recording and to receive the modulated light. A writer heater of the slider is configured to receive power during the write operation having a magnitude that varies or is constant. A sensor is situated on or within the slider. The sensor is configured to produce a sensor signal representative of output optical power of the laser diode. Measuring circuitry is coupled to the sensor and configured to measure a change in the sensor signal indicative of a laser mode hop during the write operation.

20 Claims, 15 Drawing Sheets

(56) References Cited

U.S. PATENT DOCUMENTS

| | | | | |
|---|---|---|---|---|
| 9,583,135 B1* | 2/2017 | Ma | ............ | G11B 20/10305 |
| 9,595,288 B1* | 3/2017 | Chu | ............ | G11B 7/1267 |
| 9,747,937 B1* | 8/2017 | Duda | ............ | G11B 5/314 |
| 9,824,705 B1* | 11/2017 | Macken | ............ | G11B 7/1263 |
| 9,905,996 B2* | 2/2018 | Wessel | ............ | H01S 5/06804 |
| 9,916,851 B1* | 3/2018 | Seigler | ............ | G11B 5/012 |
| 9,972,350 B1* | 5/2018 | Macken | ............ | G11B 5/6005 |
| 10,147,454 B1* | 12/2018 | Mendonsa | ............ | G11B 5/455 |
| 2013/0107680 A1 | 5/2013 | Contreras et al. | | |
| 2013/0286805 A1* | 10/2013 | Macken | ............ | G11B 5/314 |
| | | | | 369/13.33 |
| 2015/0036469 A1 | 2/2015 | Johnson et al. | | |
| 2015/0162022 A1* | 6/2015 | Peng | ............ | G11B 5/3945 |
| | | | | 360/66 |
| 2015/0279430 A1* | 10/2015 | Trantham | ............ | G11B 5/314 |
| | | | | 369/13.26 |
| 2015/0340053 A1* | 11/2015 | Peng | ............ | G11B 5/314 |
| | | | | 369/13.33 |
| 2016/0087402 A1* | 3/2016 | Tatah | ............ | H01S 5/06804 |
| | | | | 372/34 |
| 2016/0104514 A1* | 4/2016 | Burnett | ............ | G11B 5/6088 |
| | | | | 369/13.02 |
| 2016/0284372 A1* | 9/2016 | Duda | ............ | G11B 5/314 |
| 2017/0162222 A1* | 6/2017 | Matousek | ............ | G11B 7/126 |
| 2017/0370770 A1 | 12/2017 | Kiely et al. | | |

* cited by examiner

LASER MODE HOP DETECTION IN A HEAT-ASSISTED MAGNETIC RECORDING DEVICE USING A SLIDER SENSOR AND LASER MODULATION

RELATED APPLICATIONS

This application claims the benefit of Provisional Patent Application Ser. No. 62/506,048 filed on May 15, 2017, which is hereby incorporated herein by reference in its entirety.

SUMMARY

Embodiments are directed to a method implemented while writing to a magnetic recording medium using a slider configured for heat-assisted magnetic recording. The method comprises supplying a modulated current to a laser diode of or near the slider to produce modulated light. The modulated current has a mean amplitude that varies or is constant. The method comprises supplying power to a writer heater of the slider. The power has a magnitude that varies or is constant. The method also comprises producing, by a sensor on or within the slider, a sensor signal representative of output optical power of the laser diode. The method further comprises measuring a change in the sensor signal, and detecting a laser mode hop using the measured sensor signal change.

Embodiments are directed to an apparatus comprising a laser diode configured to generate modulated light during a write operation in response to receiving modulated current having a mean amplitude that varies or is constant. A slider is configured for heat-assisted magnetic recording and to receive the modulated light. A writer heater of the slider is configured to receive power during the write operation having a magnitude that varies or is constant. A sensor is situated on or within the slider. The sensor is configured to produce a sensor signal representative of output optical power of the laser diode. Measuring circuitry is coupled to the sensor and configured to measure a change in the sensor signal indicative of a laser mode hop during the write operation.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to superparamagnetic effects that can lead to data errors.

Figure 1:
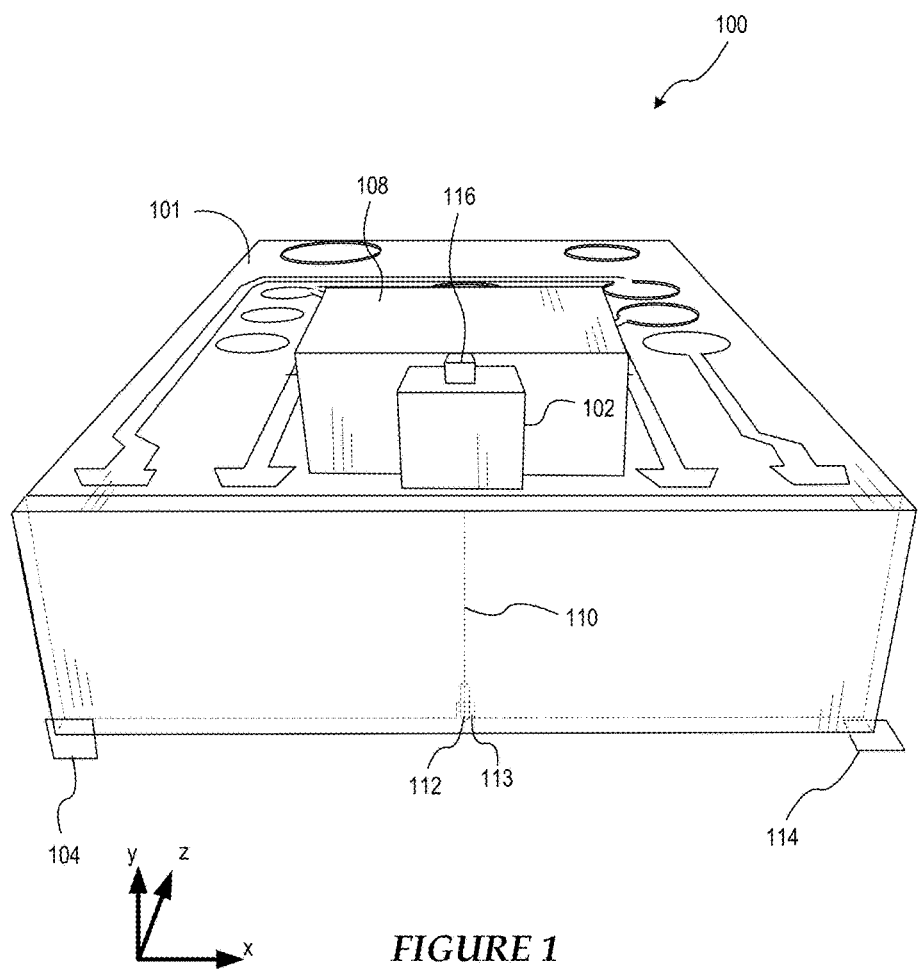
FIG. 1 is a perspective view of a HAMR slider with which various embodiments disclosed herein may be implemented.
Figure 2:
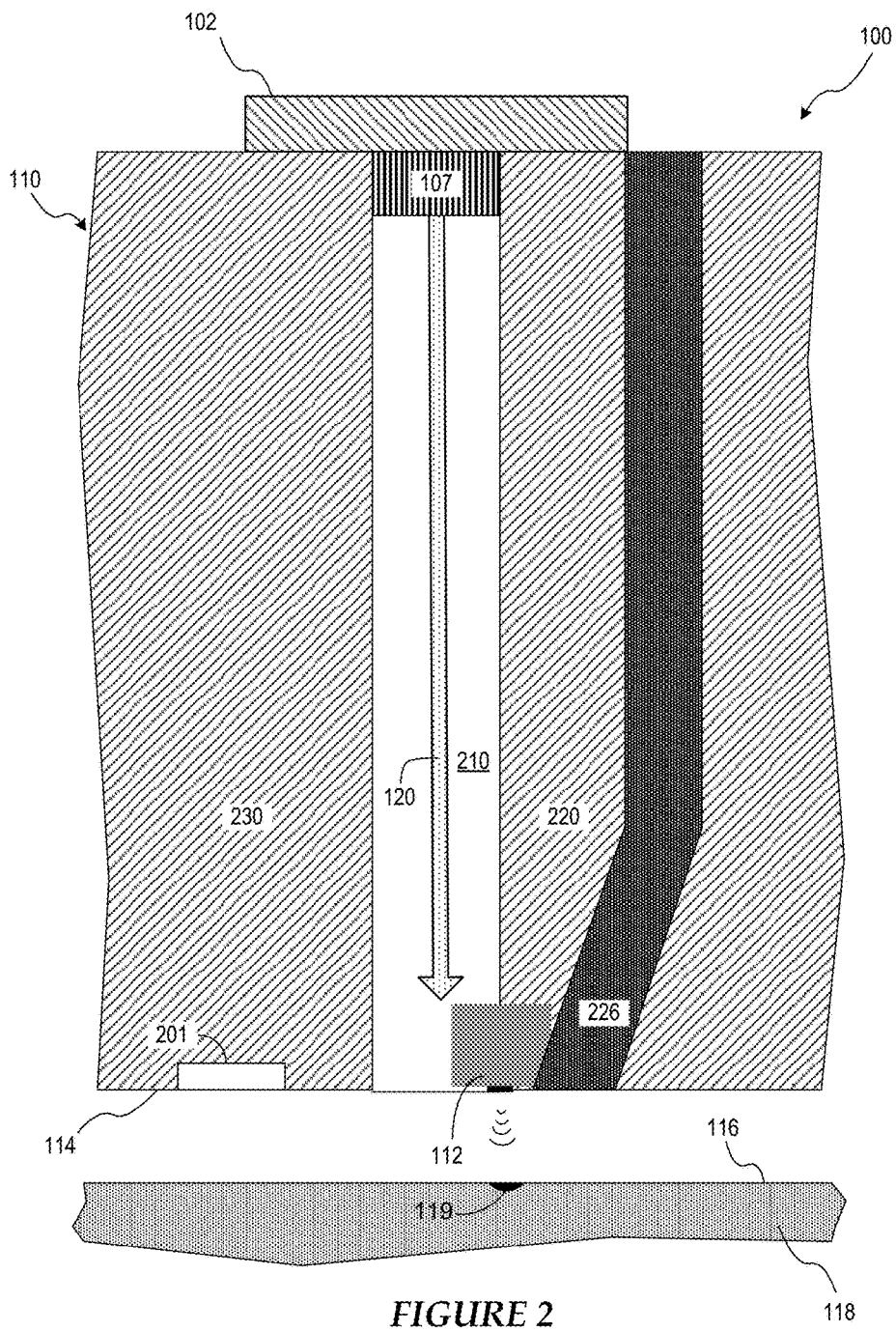
FIG. 2 is a cross-sectional view of a HAMR slider with which various embodiments disclosed herein may be implemented.

Embodiments of a HAMR slider 100 are illustrated in FIGS. 1 and 2. As shown, the head 100 (also referred to as a slider) includes a light source (e.g., a laser diode) 102 located proximate a trailing edge surface 104 of the slider body 101. An optical wave (e.g., a laser beam) 120 generated by the light source 102 is delivered to an NFT 112 via an optical waveguide 110. The NFT 112 is aligned with a plane of an air bearing surface (ABS) 114 of the head 100, and one edge of a read/write head 113 is on the ABS 114. The read/write head 113 includes at least one writer and at least one reader. In some embodiments, multiple writers (e.g., 2 writers) and multiple readers (e.g., 3 readers) can be incorporated into the read/write head 113. The ABS 114 faces, and is held proximate to, a surface 116 of a magnetic medium 118 during device operation. The ABS 114 is also referred to as a media-facing surface.

The light source 102 in this representative example may be an integral, edge firing device, although it will be appreciated that any source of electromagnetic energy may be used. For example, a surface emitting laser (SEL), instead of an edge firing laser, may be used as the source 102. A light source may also be mounted alternatively to other surfaces of the head 100, such as the trailing edge surface 104. In some embodiments, a laser diode 102 can be built into the slider 100 itself. For example, the laser diode 102 can be fabricated directly as part of the slider 100 itself. As another example, the laser diode 102 can be a separate component that is directly embedded inside the slider 100, rather than on top or alongside of the slider 100 as is shown in the embodiments illustrated in FIGS. 1 and 2. While the representative embodiments of FIGS. 1 and 2 show the waveguide 110 integrated with the head 100, any type of light delivery configuration may be used. As shown in FIG. 1, the laser diode 102 is shown coupled to the slider body 101 via a submount 108. The submount 108 can be used to orient and affix an edge-emitting laser diode 102 so that its output is directed downwards (negative y-direction in the figure). An input surface of the slider body 101 may include a grating, an optical coupler, or other coupling features to receive light from the laser diode 102.

When writing with a HAMR device, electromagnetic energy is concentrated onto a small hotspot 119 over the track of the magnetic medium 118 where writing takes place, as is shown in the embodiment of FIG. 2. The light from the light source 102 propagates to the NFT 112, e.g., either directly from the light source 102 or through a mode converter or by way of a focusing element. FIG. 2, for example, shows an optical coupler 107 adjacent the light source 102, which is configured to couple light produced from the light source 102 to the waveguide 110.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 119 is on the order of 50 nm or less. Thus, the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device configured to generate local surface plasmon resonance at a designated (e.g., design) wavelength. The NFT 112 is generally formed from a thin film of plasmonic material on a substrate. In a HAMR slider 100, the NFT 112 is positioned proximate the write pole 226 of the read/write head 113. The NFT 112 is aligned with the plane of the ABS 114 parallel to the surface 116 of the magnetic medium 118. The waveguide 110 and optional mode converter 107 and/or other optical element directs electromagnetic energy 120 (e.g., laser light) onto the NFT 112. The NFT 112 achieves surface plasmon resonance in response to the incident electromagnetic energy 120. The plasmons generated by this resonance are emitted from the NFT 112 towards the magnetic medium 118 where they are absorbed to create a hotspot 119. At resonance, a high electric field surrounds the NFT 112 due to the collective oscillations of electrons at the metal surface (e.g., substrate) of the magnetic medium 118. At least a portion of the electric field surrounding the NFT 112 gets absorbed by the magnetic medium 118, thereby raising the temperature of a spot 119 on the medium 118 as data is being recorded.

FIG. 2 shows a detailed partial cross-sectional view of an embodiment of the HAN/JR slider 100 in accordance with various embodiments. The waveguide 110 includes a layer of core material 210 surrounded by first and second cladding layers 220 and 230. The first cladding layer 220 is shown proximate the NFT 112 and the write pole 226. The second cladding layer 230 is spaced away from the first cladding layer 220 and separated therefrom by the waveguide core 210. The core layer 210 and cladding layers 220 and 230 may be fabricated from dielectric materials, such as optical grade amorphous material with low thermal conductivities. The first and second cladding layers 220 and 230 may each be made of the same or a different material. The materials are selected so that the refractive index of the core layer 210 is higher than refractive indices of the cladding layers 220 and 230. This arrangement of materials facilitates efficient propagation of light through the waveguide core 210. Optical focusing elements (not shown) such as mirrors, lenses, etc., may be utilized to concentrate light onto the NFT 112. These and other components may be built on a common substrate using wafer manufacturing techniques known in the art. The waveguide 110 may be configured as a planar waveguide or channel waveguide.

According to some embodiments, the head 100 includes one or more sensors, such as the sensor 201 shown in FIG. 2. In some embodiments, the sensor 201 can be a contact sensor configured to sense for one or more of head-medium contact, thermal asperities, and voids of a magnetic recording medium. In other embodiments, the sensor 201 can be a bolometer or a combined contact sensor/bolometer. The sensor 201 is configured to produce a response to modulated laser light that is used to detect laser diode instability, such as mode hops, in accordance with various embodiments disclosed herein.

The sensor 201 can be a resistive sensor that can be implemented as a thermal sensor, such as a resistive temperature sensor (e.g., TCR sensor). For example, the sensor 201 can be implemented as a DETCR (Dual Ended Thermal Coefficient of Resistance) sensor. The sensor 201 can alternatively be implemented as a ground-split TCR sensor, where one contact of the sensor 201 is coupled to a bias source and the other contact is coupled to ground. The sensor 201 can be a thermo-resistive/electric sensor, a piezoresistive/electrical sensor or an electromechanical sensor, for example. By way of further example, the sensor 201 can be a thermocouple or a thermistor. The sensor 201 can be situated at or near the ABS 114 and proximate the NFT 112. As such, the sensor 201 can also serve as a temperature sensor for the NFT 112 and as a head-medium/asperity contact sensor.

The output of a laser diode used in a HAMR drive is temperature sensitive and susceptible to self-heating. During write operation, for example, laser diode heating can vary the junction temperature of the laser diode, causing a shift in laser emission wavelength, leading to a change of optical feedback from the optical path in the slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another. It is noted that the laser output power can jump in either direction (higher or lower) with a mode hop and that a jump in either direction is undesirable. Large transition shifts in a block of data due to a mode hop may not be recoverable by channel decoding, resulting in error bits. Accurate laser power monitoring can be particularly helpful is avoiding mode hopping in HAMR devices.

Embodiments of the disclosure are directed to apparatuses and methods for measuring a change in the response of a sensor of a HAMR slider indicative of a laser mode hop. More particularly, embodiments are directed to measuring changes in the output optical power of a laser diode using a signal produced by a sensor of the HAMR slider, and detecting a laser mode hop using the measured sensor signal changes. According to various embodiments, a sensor of a HAMR slider can be characterized across the stroke at the associated laser diode current and write settings. While performing write operations, the response of the sensor is measured. Changes in the response of the sensor are measured and, if exceeding a threshold, such changes can indicate laser mode hops. Changes in the sensor response above the threshold can trigger further checks, characterization of the written data, and/or remedial action.

Figure 3:
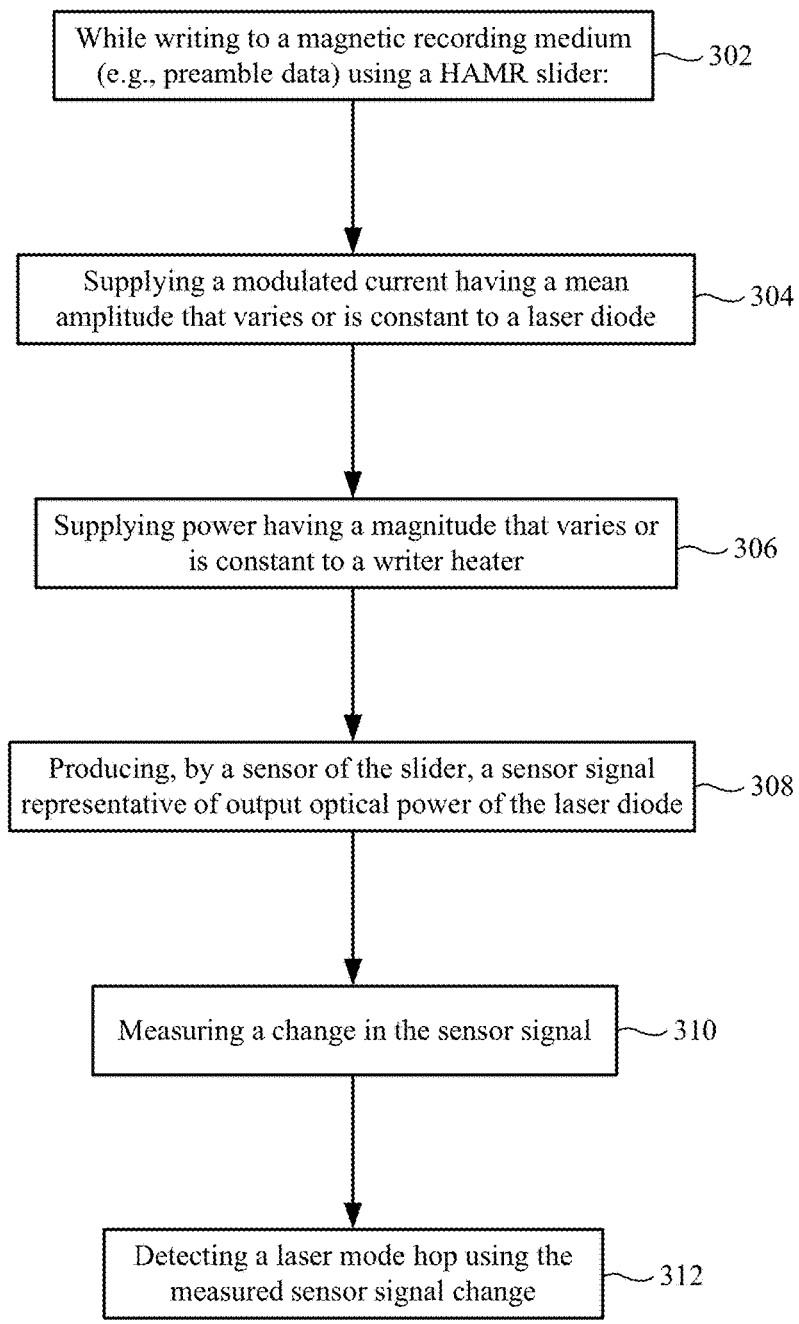
FIG. 3 illustrates a method of detecting laser mode hops while writing data to a magnetic recording medium using a HAMR slider in accordance with various embodiments.

FIG. 3 illustrates a method of detecting laser mode hops while writing data to a magnetic recording medium using a HAMR slider in accordance with various embodiments. The processes shown in FIG. 3 are implemented while writing 302 to a magnetic recording medium using the HAMR slider. According to some embodiments, the processes shown in FIG. 3 (and other figures) are implemented while writing preamble data to a sector of the recording medium. By characterizing the response of the sensor at data preamble conditions, a special pattern that takes test time does not have to be developed. Moreover, characterizing the sensor response while writing preamble data is preferred over performing the characterization while writing customer data to the sector, which would make accurate characterization of the sensor response more challenging.

While writing to the recording medium 302, a modulated current is supplied 304 to a laser diode of the HAMR slider. In the embodiment shown in FIG. 3 and in other figures, the modulated current can have a frequency between about 3 kHz and 10 MHz (e.g., between about 10 kHz and 1 MHz). The modulated current has a mean (e.g., average) amplitude that varies or is constant. Varying the modulated current can involve sweeping the modulated current between a minimum and a maximum. For example, the minimum can be a modulated current below a threshold current, $I_{Th}$, of the laser diode, and the maximum can be a modulated current, $I_{OP}$, needed to write or erase data to/from the recording medium. The method shown in FIG. 3 also involves supplying 306 power having a magnitude that varies or is constant to a writer heater of the HAMR slider. Varying the writer heater power can involve sweeping the writer heater power between a minimum power level and a maximum power level. For example, the minimum power level can be zero power which can result in a maximum fly height of the slider. The maximum power level can be a magnitude of writer heater power that produces a protrusion of the slider sufficient in size to cause contact or near contact between the slider and the recording medium.

The method shown in FIG. 3 further involves producing 308, by a sensor of the HAMR slider, a sensor signal representative of output optical power of the laser diode. The method involves measuring 310 a change in the sensor signal, and detecting 312 a laser mode hop using the measured sensor signal change. Measuring the sensor signal change 310 can involve measuring the change at a frequency corresponding to the frequency of the modulated current supplied to the laser diode (e.g., via notch or narrowband filtering or signal processing using a Fast Fourier Transform of the signal). Detecting a laser mode hop 312 can involve comparing the measured change in the sensor signal to a threshold, such as a predetermined percentage change (e.g., >20%), magnitude change, or standard deviation of the measured sensor signal.

As will be discussed below, detecting a laser mode hop 312 can involve detecting a kink (e.g., a dip, a bump or other deviation or inflection) in the measured sensor signal. This kink in the measured sensor signal is caused by a change in the signal amplitude and phase. As such, the response of the sensor can be used to detect a laser mode hop, thereby obviating the complexities of analyzing a readback signal from the reader for indications of laser mode hopping. In response to detecting a laser mode hop 312, various remedial actions can be performed. For example, the write operation can be retried or the written data can be re-read (or both). If remedial operations fail, a signal can be generated informing the drive and/or host that degradation of the NFT has been detected. Spurious faults can result in recalibration of the sensor and/or detection threshold(s). As other examples, a write protect procedure can be implemented or short writes rather than long writes can be instigated. In another example, a read-after-write protocol can be implemented. In a further example, the host can be notified to refrain from long writes. As another example, the laser diode current can be slightly increased or decreased to shift the laser diode away from a region of instability. Other parameters, such as writer current or writer heater current, may be adjusted as part of mitigating mode hopping. Also, the laser diode current, writer heater power, and write settings can be recorded so that this combination of settings (now known to produce a mode hop) can be avoided during subsequent write operations.

Figure 4A:
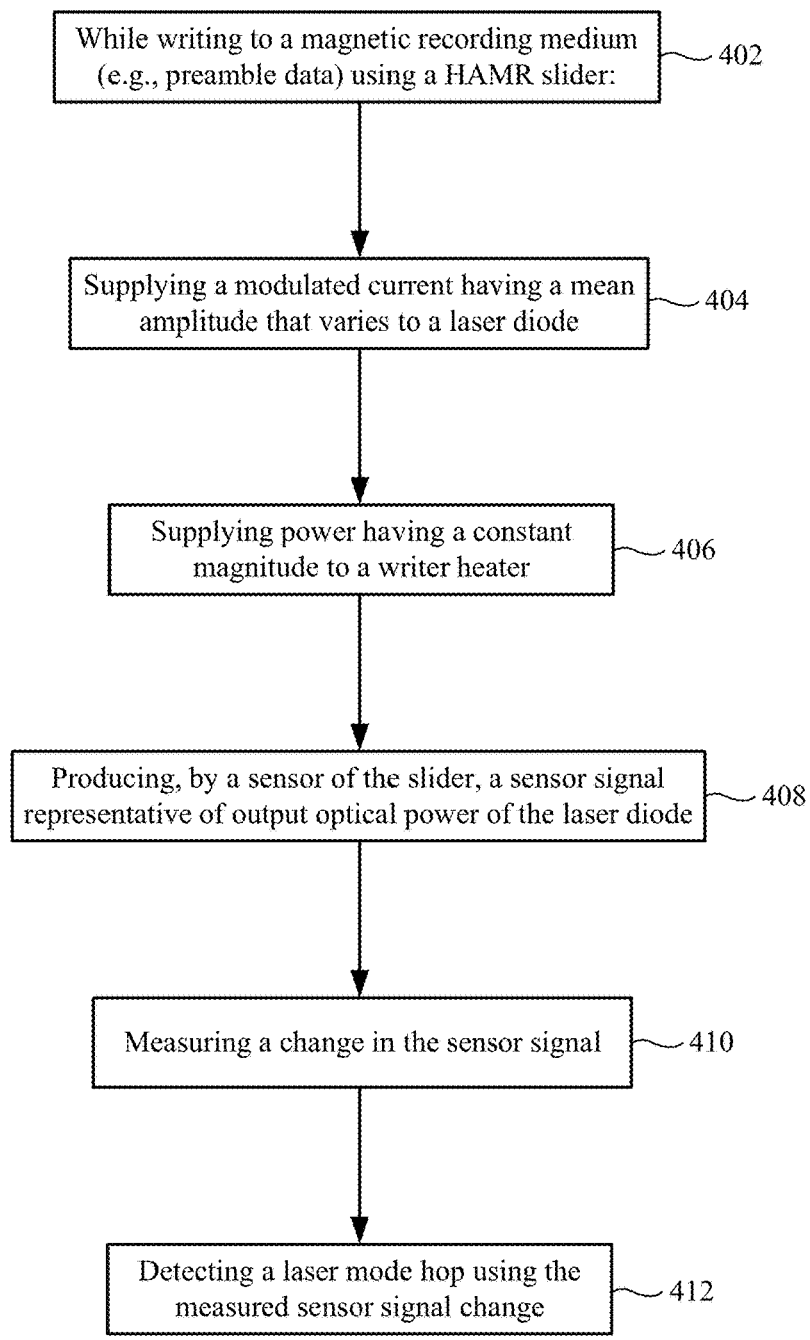
FIG. 4A illustrates a method of detecting laser mode hops while writing data to a magnetic recording medium using a HAMR slider in accordance with some embodiments.
Figure 4B:
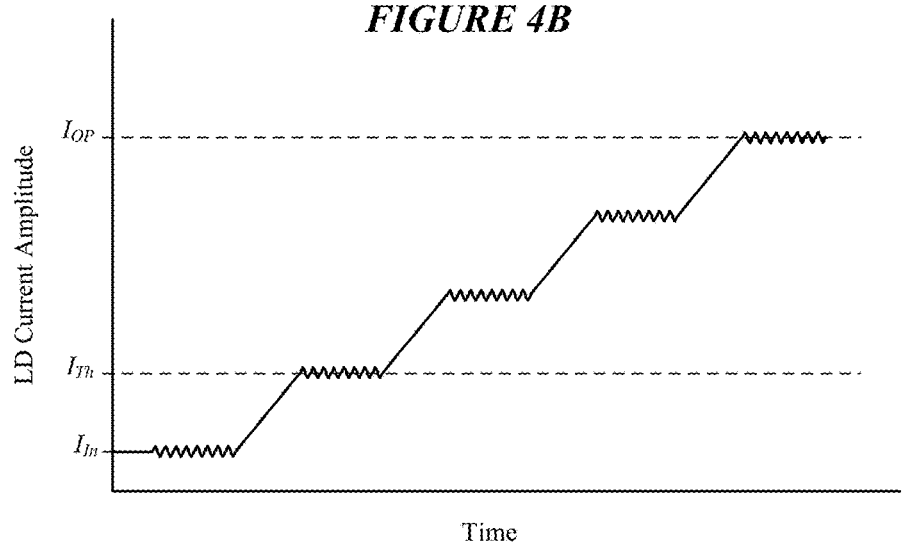
FIGS. 4B and 4C respectively show modulated laser diode current and writer heater curves for the laser mode hop detection method illustrated in FIG. 4A.
Figure 4C:
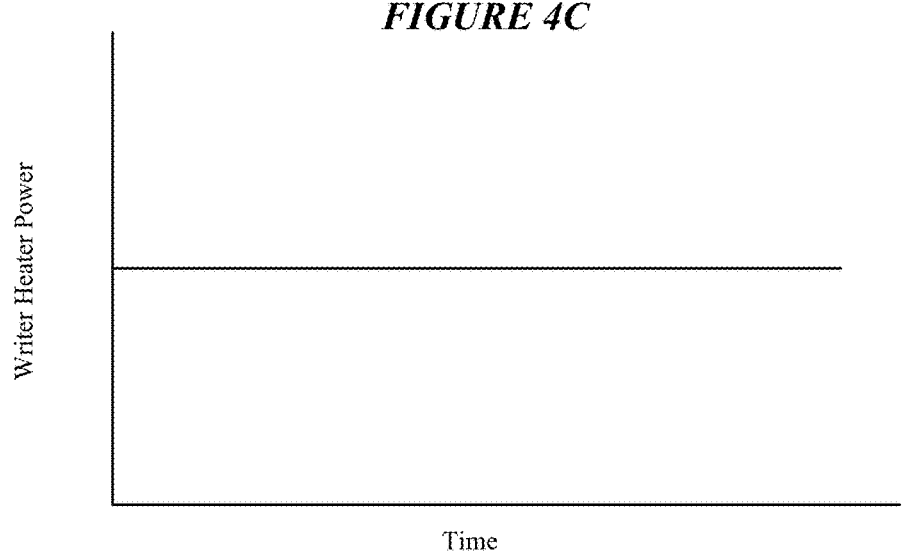

FIG. 4A illustrates a method of detecting laser mode hops while writing data to a magnetic recording medium using a HAMR slider in accordance with various embodiments. The processes shown in FIG. 4A are implemented while writing 402 (e.g., preamble data) to a magnetic recording medium using the HAMR slider. The method involves supplying 404 a modulated current to the laser diode of the HAMR slider, such that the modulated current has a mean amplitude that varies (e.g., is swept). Reference is made to FIG. 4B which shows sweeping of modulated current supplied to a laser diode between an initial (e.g., minimum) current level, $I_{In}$, and a current level (e.g., maximum), $I_{OP}$, needed for writing or erasing data to/from the recording medium. It is noted that the initial current level, $I_{In}$, is preferably a current below the threshold current, $I_{Th}$, of the laser diode, which can be a zero current level. The method involves supplying 406 power having a magnitude that is constant to a writer heater of the HAMR slider. Reference is made to FIG. 4C which shows constant power supplied to the writer heater while writing the data to the recording medium.

While sweeping the modulated current supplied to the laser diode and supplying constant power to the writer heater, the method involves producing 408, by a sensor of the HAMR slider, a sensor signal representative of output optical power of the laser diode. The sensor signal is monitored and changes in the sensor signal are measured 410. Measuring the sensor signal change 410 can involve measuring the change at a frequency corresponding to the frequency of the modulated current supplied to the laser diode, such as in a manner previously described. The method further involves detecting 412 a laser mode hop using the measured sensor signal change, such as in a manner previously described. As is discussed above, various remedial actions can be performed in response to detecting a laser mode hop 412.

Figure 4D:
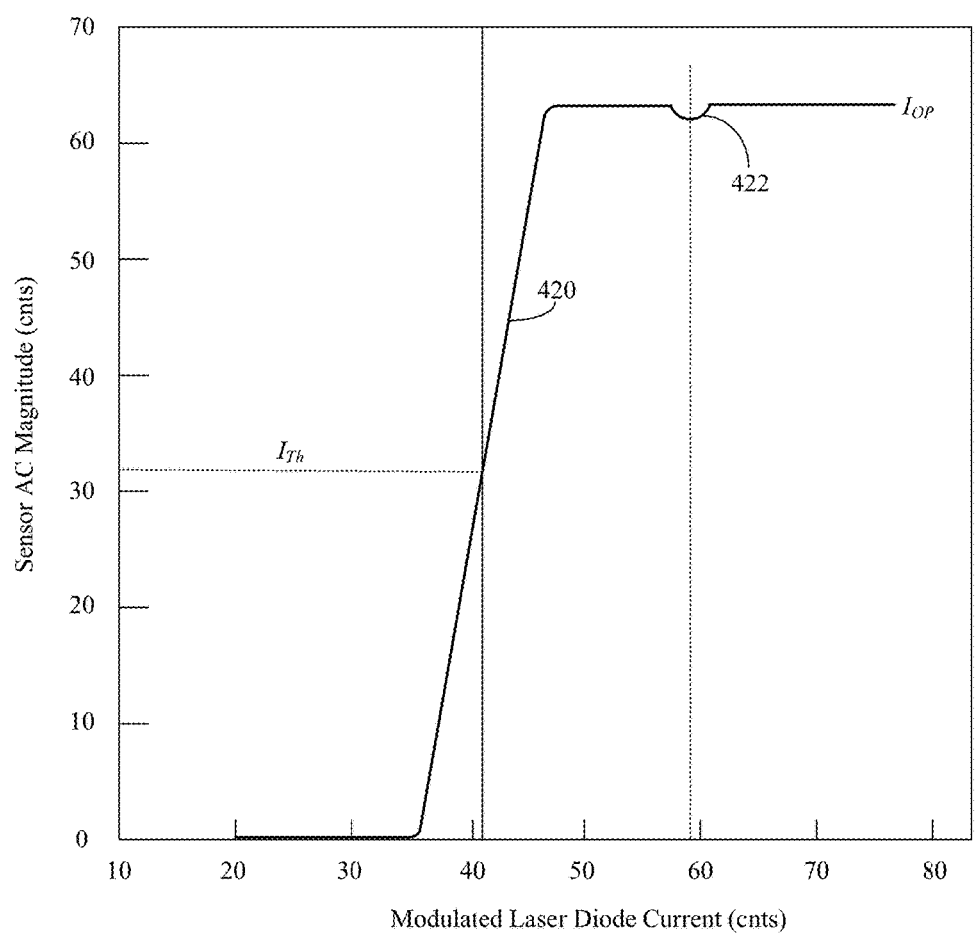
FIG. 4D illustrates the response of a sensor when implementing the laser mode hop detection method illustrated in FIG. 4A.

FIG. 4D illustrates the response 420 of a sensor when implementing the laser mode hop detection method illustrated in FIG. 4A. It is noted that the response 420 shown in FIG. 4D is a reproduction of the signal produced by a sensor of a HAMR slider acquired during an experiment. In FIG. 4D, the y-axis is given in terms of sensor AC magnitude (counts), and the x-axis is given in terms of modulated laser diode current (counts). As can be seen in FIG. 4D, the modulated laser diode current is swept between a minimum current level (~20 counts) below the laser diode threshold current, $I_{Th}$, and a maximum current level (~77 counts) corresponding to a current level, $I_{OP}$, needed to write or erase data to/from the recording medium.

A kink 422 in the response 420 of the sensor can be seen at around 59 counts of the laser diode current. The kink 422 indicates the occurrence of a laser mode hop at the associated laser diode current and a writer heater power levels. It is noted that the kink 422 translates left and right from its position shown in FIG. 4D depending on the magnitude of the power supplied to the writer heater. For example, it is been observed that the kink 422 moves from left to right in response to progressively decreasing the writer heater power.

FIG. 5 illustrates a method of detecting laser mode hops while writing data to a magnetic recording medium using a HAMR slider in accordance with various embodiments. The processes shown in FIG. 5A are implemented while writing 502 (e.g., preamble data) to a magnetic recording medium using the HAMR slider. The method involves supplying 504 a modulated current having a constant mean amplitude to a laser diode of the HAMR slider. The constant mean amplitude can be a current level, $I_{OP}$, needed for writing or erasing data to/from the recording medium. Reference is made to FIG. 5B which shows a modulated current, $I_{OP}$, having a constant mean amplitude which is supplied to the laser diode.

The method also involves supplying 506 power having a magnitude that varies to a writer heater of the HAMR slider. FIG. 5C illustrate sweeping of the writer heater power across a range of power levels between an initial (e.g., minimum) and an ending (e.g., maximum) power level setting. Although not shown in FIG. 5C, the minimum writer heater power level can be zero mW. As was discussed previously, the writer heater power can be swept between a minimum level, which can result in a maximum fly height of the slider, and a maximum level, which can result in contact or near contact between the slider and the recording medium (or a subrange between these minimum and maximum levels).

While supplying modulated current having a constant mean amplitude to the laser diode and supplying power having a varying magnitude to the writer heater, the method involves producing 508, by a sensor of the HAMR slider, a sensor signal representative of output optical power of the laser diode. The sensor signal is monitored and changes in the sensor signal are measured 510. Measuring the sensor signal change 510 can involve measuring the change at a frequency corresponding to the frequency of the modulated current supplied to the laser diode, such as in the manner previously described. The method further involves detecting 512 a laser mode hop using the measured sensor signal change, such as in a manner previously described. As discussed previously, various remedial actions can be performed in response to detecting a laser mode hop 512.

Figure 5A:
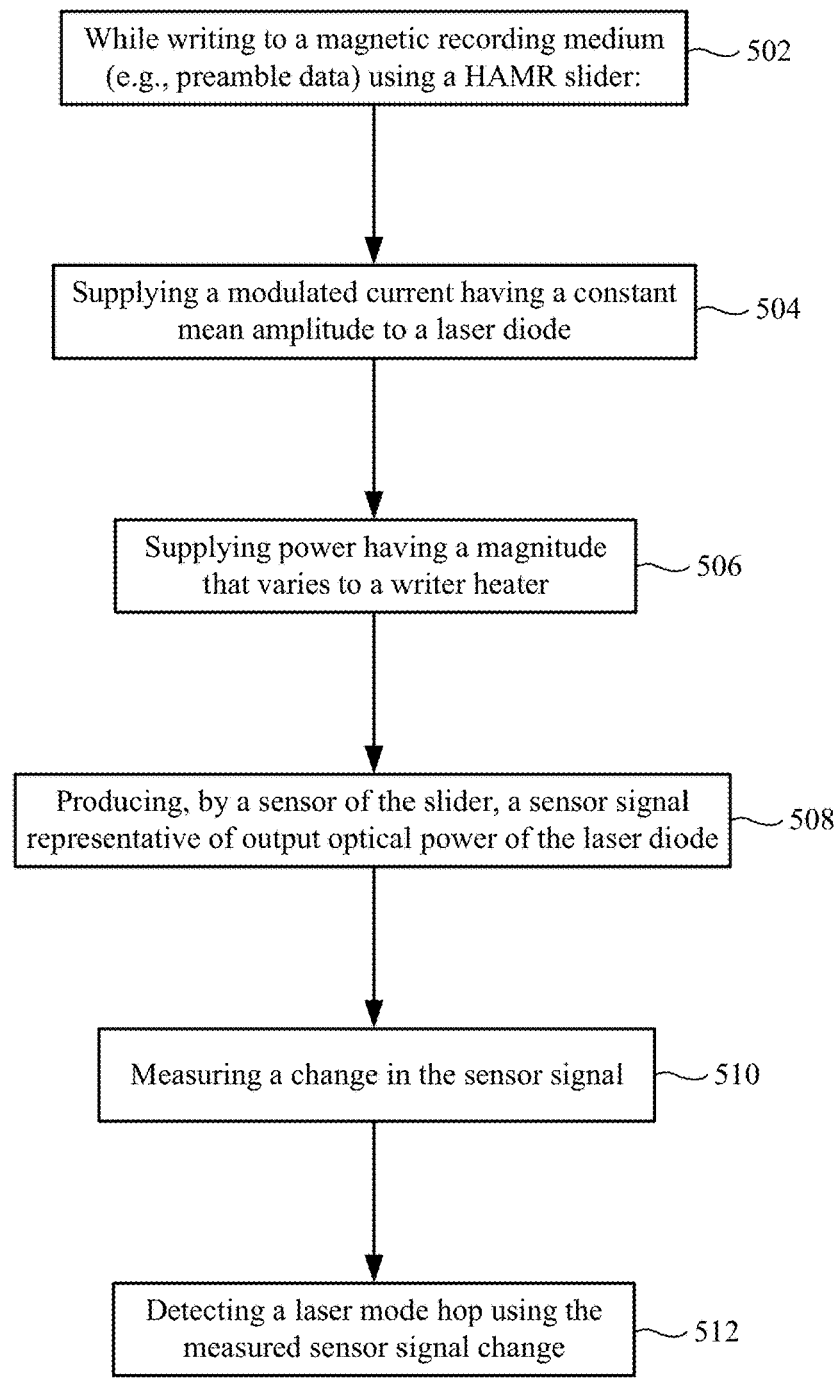
FIG. 5A illustrates a method of detecting laser mode hops while writing data to a magnetic recording medium using a HAMR slider in accordance with other embodiments.
Figure 5B:
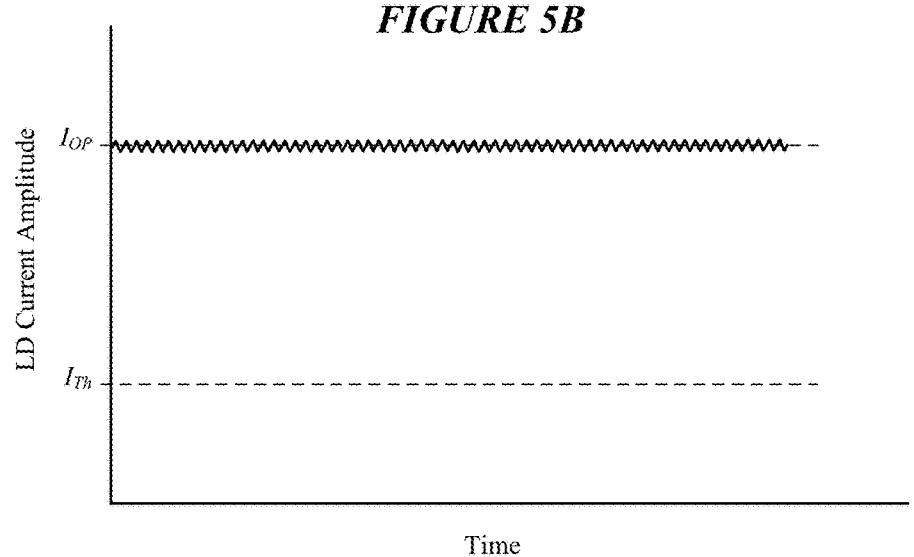
FIGS. 5B and 5C respectively show modulated laser diode current and writer heater curves for the laser mode hop detection method illustrated in FIG. 5A.
Figure 5C:
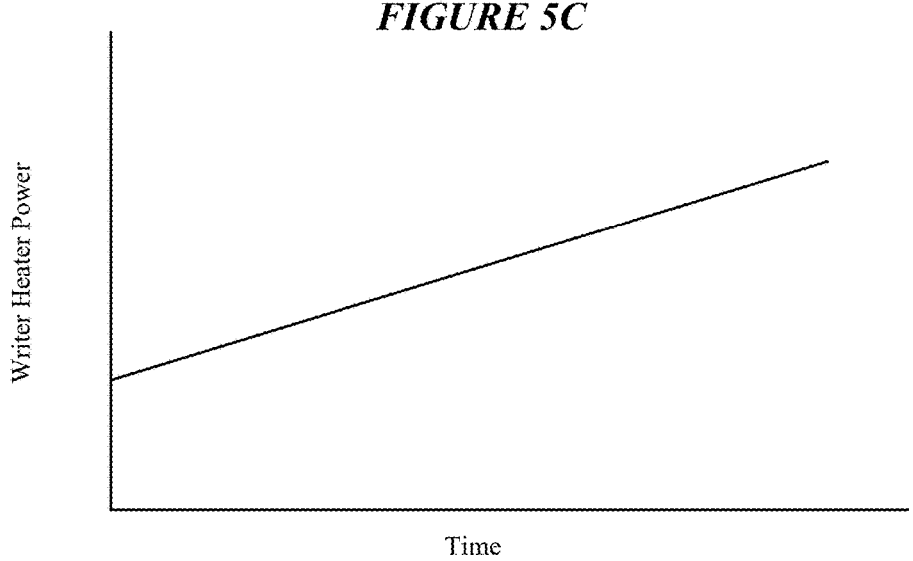
Figure 5D:
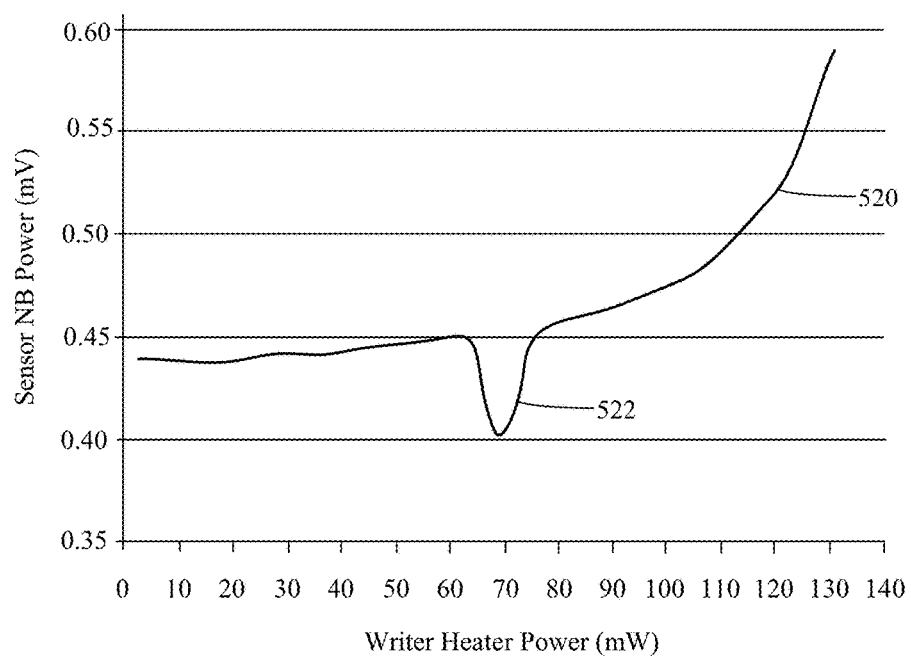
FIG. 5D illustrates the response of a sensor when implementing the laser mode hop detection method illustrated in FIG. 5A.

FIG. 5D illustrates the response 520 of a sensor when implementing the laser mode hop detection method illustrated in FIG. 5A. It is noted that the response 520 shown in FIG. 5D is a reproduction of the signal produced by a sensor of a HAMR slider acquired during an experiment. In FIG. 5D, the x-axis is given in terms of writer heater power (mW) and the y-axis is given in terms of sensor narrowband (NB) power (mV). As can be seen in FIG. 5D, the writer heater power is swept between about 3 and 130 mW, while the modulated current supplied to the laser diode is held at a constant mean amplitude (see FIG. 5B). A kink 522 in the response 520 of the sensor can be seen at around 70 mW of writer heater power. This kink 522 is readily detectable as an occurrence of a laser mode hop at the associated laser diode current and writer heater power levels.

Figure 6A:
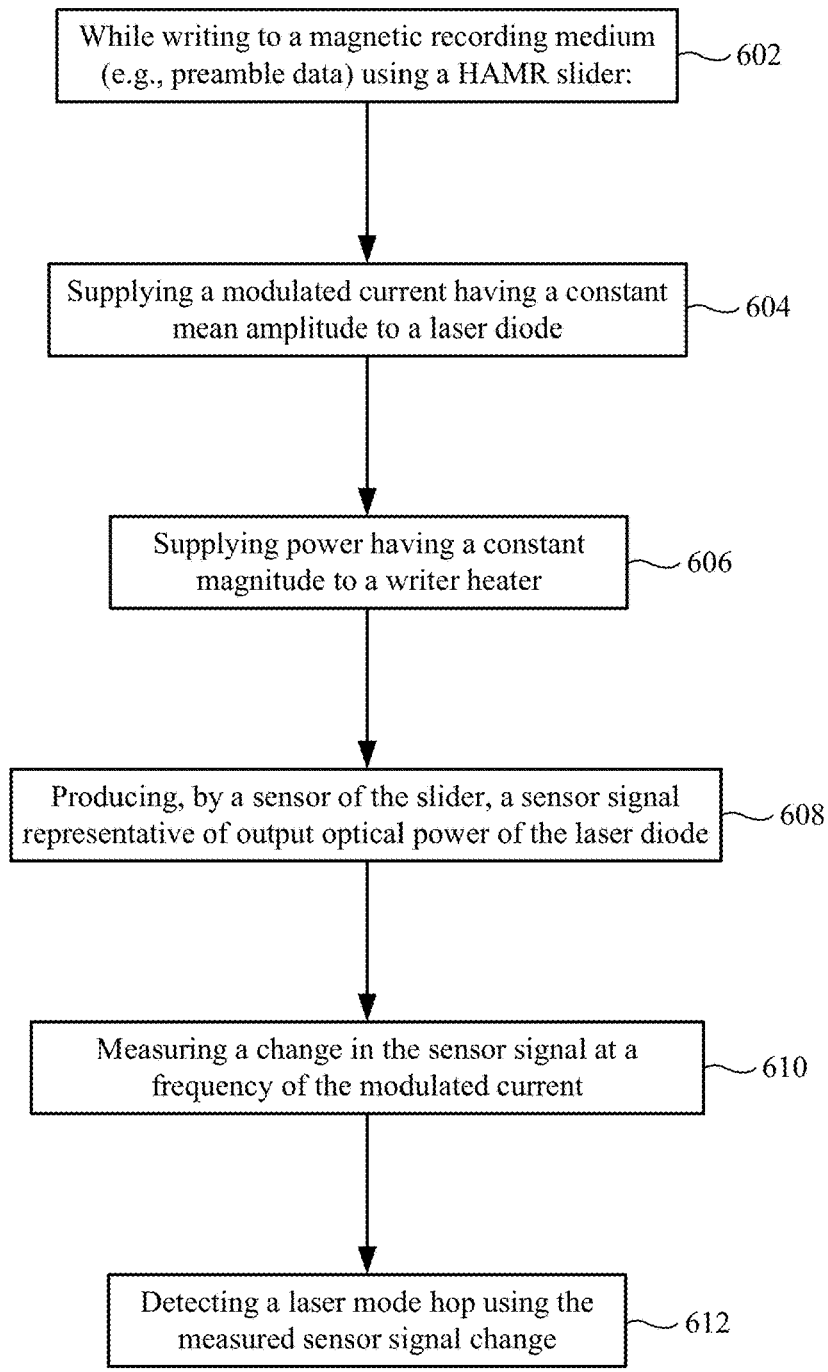
FIG. 6A illustrates a method of detecting laser mode hops while writing data to a magnetic recording medium using a HAMR slider in accordance with further embodiments.
Figure 6B:
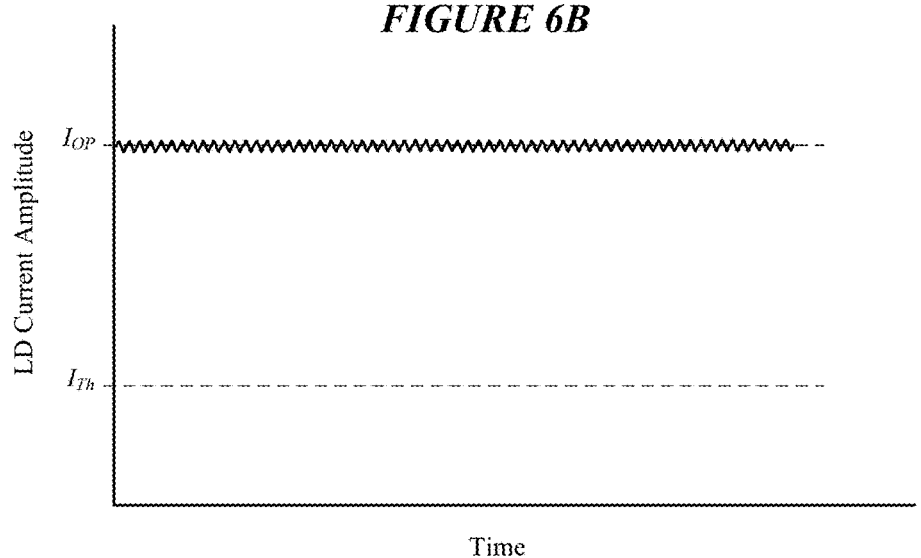
FIGS. 6B and 6C respectively show modulated laser diode current and writer heater curves for the laser mode hop detection method illustrated in FIG. 6A.
Figure 6C:
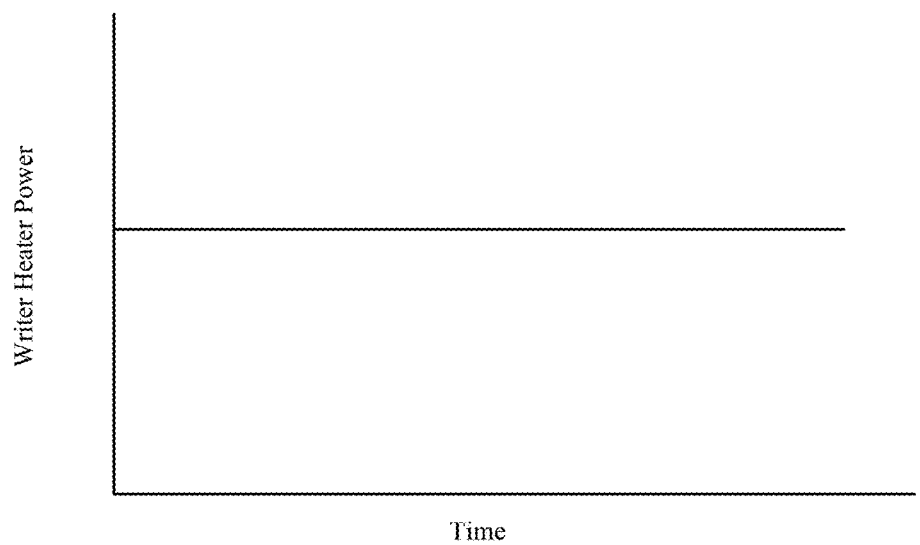

FIG. 6A illustrates a method of detecting laser mode hops while writing data to a magnetic recording medium using a HAMR slider in accordance with various embodiments. The processes shown in FIG. 6A are implemented while writing 602 (e.g., preamble data) to a magnetic recording medium using the HAMR slider. The method involves supplying 604 a modulated current having a constant mean amplitude to a laser diode. For example, and with reference to FIG. 6B, the modulated current can have an amplitude (e.g., $I_{OP}$) needed for writing or erasing data to/from the recording medium. The method involves supplying 606 power having a constant magnitude to a writer heater of the HAMR slider. Reference is made to FIG. 6C which shows a constant writer heater power can be applied to the writer heater while concurrently supplying a modulated current having a constant mean amplitude to the laser diode (as seen in FIG. 6B).

While supplying modulated current having a constant mean amplitude to the laser diode and supplying power having a constant magnitude to the writer heater, the method involves producing 608, by a sensor of the HAMR slider, a sensor signal representative of output optical power of the laser diode. The sensor signal is monitored and changes in the sensor signal are measured 610. More particularly, measuring the sensor signal change 610 involves measuring the change at a frequency corresponding to the frequency of the modulated current supplied to the laser diode, such as in the manner previously described. The method further involves detecting 612 a laser mode hop using the measured sensor signal change, such as in a manner previously described. As discussed previously, various remedial actions can be performed in response to detecting a laser mode hop 612.

Figure 7A:
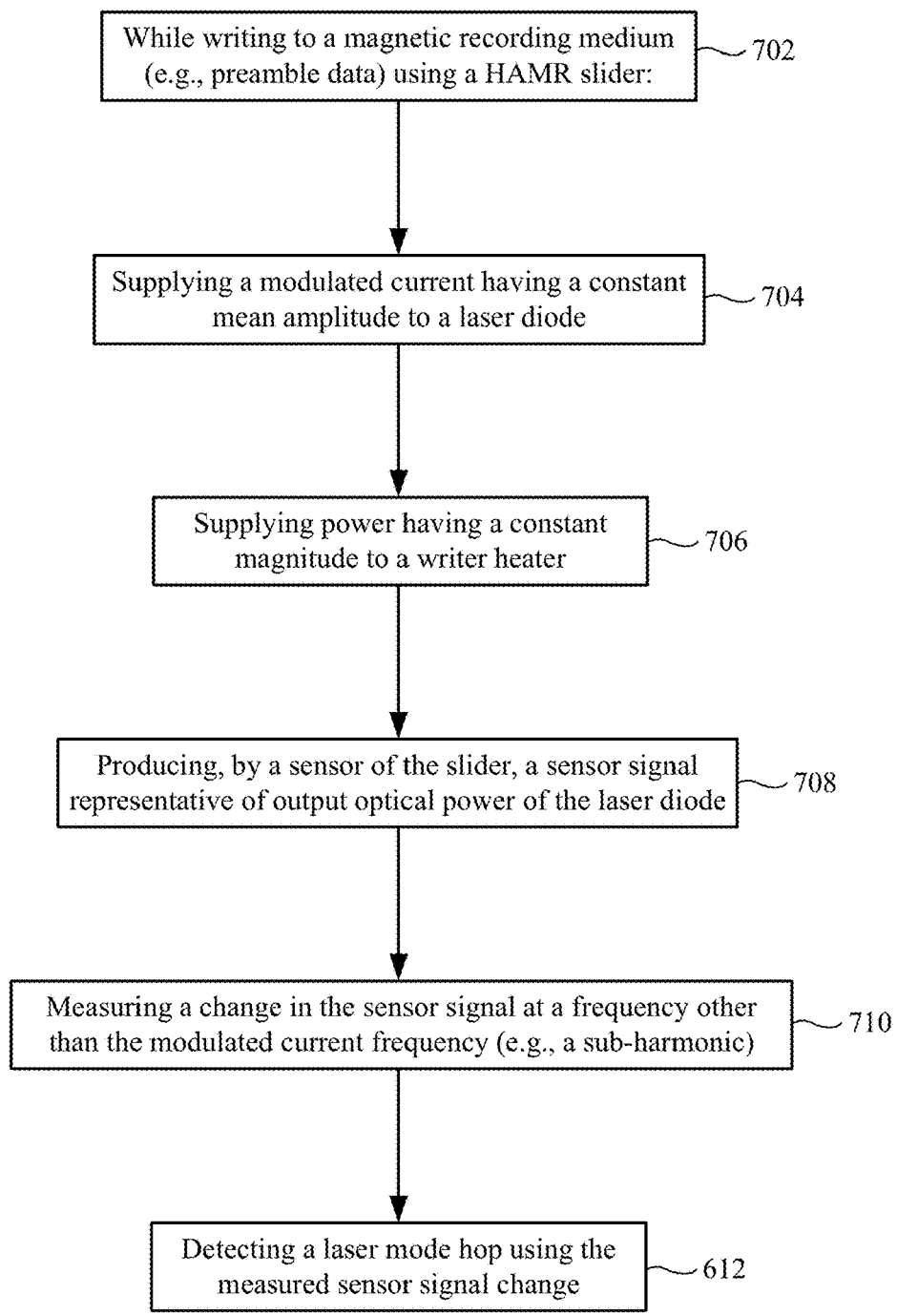
FIG. 7A illustrates a method of detecting laser mode hops while writing data to a magnetic recording medium using a HAMR slider in accordance with some embodiments.

FIG. 7A illustrates a method of detecting laser mode hops while writing data to a magnetic recording medium using a HAMR slider in accordance with various embodiments. The processes shown in FIG. 7A are implemented while writing 702 (e.g., preamble data) to a magnetic recording medium using the HAMR slider. The method involves supplying 704 a modulated current having a constant mean amplitude to a laser diode. For example, and with reference to FIG. 6B, the modulated current can have an amplitude (e.g., $I_{OP}$) needed for writing or erasing data to/from the recording medium. The method involves supplying 706 power having a constant magnitude to a writer heater of the HAMR slider. Reference is made to FIG. 6C which shows a constant writer heater power can be applied to the writer heater while concurrently supplying a modulated current having a constant mean amplitude to the laser diode (as seen in FIG. 6B).

While supplying modulated current having a constant mean amplitude to the laser diode and supplying power having a constant magnitude to the writer heater, the method involves producing 708, by a sensor of the HAMR slider, a sensor signal representative of output optical power of the laser diode. The sensor signal is monitored and changes in the sensor signal are measured 710. More particularly, measuring the sensor signal change 710 involves measuring the change at a frequency other than the frequency of the modulated current supplied to the laser diode. For example, the sensor signal change 710 can be measured at a subharmonic frequency of the modulated current frequency. The method further involves detecting 712 a laser mode hop using the measured sensor signal change. As discussed previously, various remedial actions can be performed in response to detecting a laser mode hop 712.

Figure 7B:
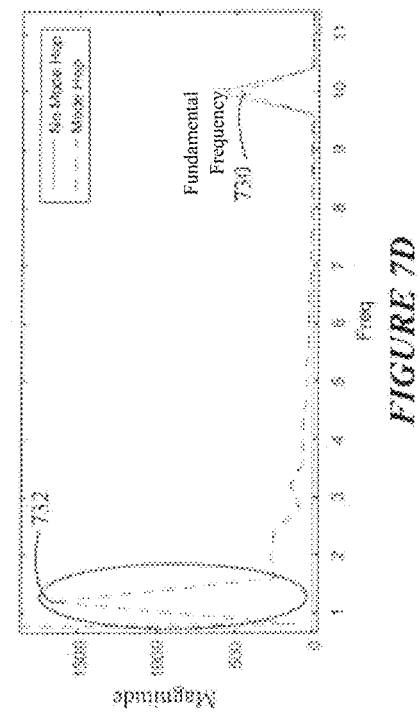
FIGS. 7B-7D illustrate signal processing aspects of the laser mode hop detection method of FIG. 7A.
Figure 7C:
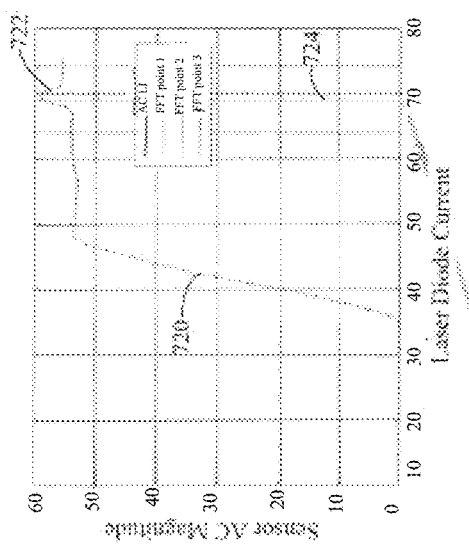
Figure 7D:
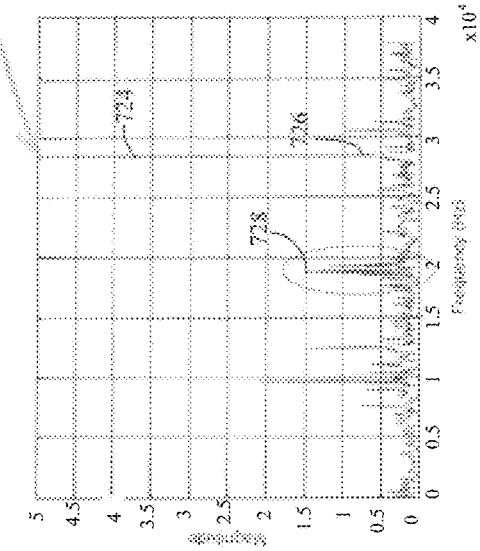

Aspects of the laser mode hop detection method of FIG. 7A are illustrated in FIGS. 7B-7D. FIG. 7B shows the response 720 of a sensor when implementing the laser mode hop detection method illustrated in FIG. 7A. A kink 722 in the response 720 indicative of a laser mode hop is detected at a laser diode current magnitude of about 69 counts. According to some embodiments, a Fast Fourier Transform (FFT) is performed on the sensor signal 720, the result of which is shown in FIG. 7C. For reference, the line 724 in FIG. 7B corresponding to an FFT point on the kink 722 is superimposed into FIG. 7C.

A peak 726 having a magnitude of about 0.8 can be seen in FIG. 7C at the fundamental frequency of the modulated current supplied to the laser diode. Notably, the peak 728 having a magnitude of nearly 1.6 (nearly twice as large as peak 726) can be seen at a subharmonic of the fundamental frequency of the modulated current. Using a subharmonic signal component of the sensor response can provide a detection signal that has a signal-to-noise ratio (SNR) higher than a signal component of the sensor at the fundamental frequency. This is best seen in FIG. 7D, which is a simulation of the frequency response of a sensor to a laser mode hop. In FIG. 7D, a peak 730 at the fundamental frequency of the modulated current has a magnitude of about 500. In comparison, a peak 732 at a subharmonic frequency has a magnitude of about 1650. FIGS. 7C and 7D demonstrate that, in some embodiments, detecting a response of the sensor at a frequency other than the fundamental frequency can provide a high SNR signal for detecting a laser mode hop.

Figure 8:
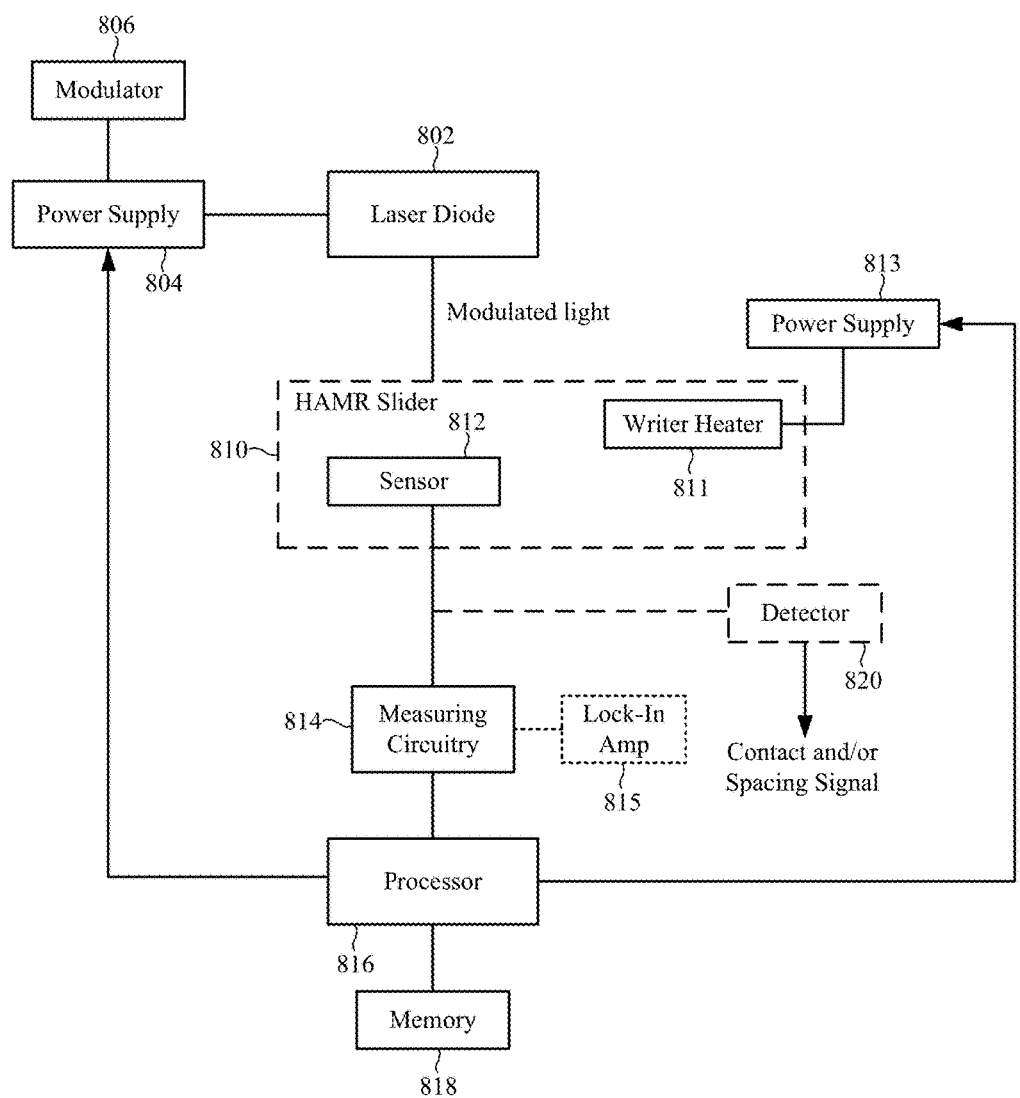
FIG. 8 is a block diagram of a system for laser power monitoring in a HAMR drive using a sensor and modulated laser light in accordance with various embodiments.

FIG. 8 is a block diagram of a system for laser power monitoring in a HAMR drive using a sensor and modulated laser light in accordance with various embodiments. The system illustrated in FIG. 8 can be used to implement any of the laser mode hop detection methodologies described hereinabove as directed by a processor 816 of the system. The system shown in FIG. 8 includes a light source 802, such as a laser diode, coupled to a power supply 804. In some embodiments, the laser-diode power supply 804 is coupled to or incorporates a modulator 806 which, together, produce a modulated current which is supplied to the laser diode 802. Depending on the detection method employed, the modulated current produced by the laser-diode power supply 804 and modulator 806 can have a constant or varying mean amplitude. Modulated light produced by the laser diode 802 is communicated to a HAMR slider 810 which, among other components, includes a sensor 812 and a writer heater 811. A power supply 813 is coupled to the writer heater 811. Depending on the detection method employed, the writer-heater power supply 813 can supply power having a constant or varying magnitude to the writer heater 811.

The sensor 812 is positioned in or near the light path of the HAMR slider 810 or other location of the slider 810 where temperature changes of the sensor 812 correspond to changes in output optical power of the laser diode 802. For example, the sensor 812 can be positioned at or near the air bearing surface of the slider 810 proximate the NFT and/or write pole. In some embodiments, a detector 820 is coupled to the slider 810 and, in particular, to the sensor 812. The detector 820 is configured to detect a signal produced by the sensor 812 indicative of contact and/or changes in spacing between the slider 810 and a magnetic recording medium.

Measuring circuitry 814 is coupled to the sensor 812. The measuring circuitry 814 is configured to monitor a signal produced by the sensor 812 during write operations and measure changes in the sensor signal. In some embodiments, the measuring circuitry 814 can include or be coupled to a lock-in amplifier 815 configured to detect changes in the sensor signal within a predetermined passband, such as the fundamental or subharmonic frequency of the modulated current frequency supplied to the laser diode 802. In other embodiments, the measuring circuitry 814 can incorporate or be coupled to a processor configured to perform an FFT on the sensor signal and detect a peak at a predetermined frequency (e.g., the fundamental or subharmonic frequency of the modulated current frequency supplied to the laser diode 802) indicative of a laser mode hop. The measuring circuitry 814 includes a comparator configured to compare the amplitude of a kink in the sensor signal to a predetermined threshold, which if exceeded indicates the occurrence of a laser mode hop.

The measuring circuitry 814 is coupled to the processor 816, which is configured to coordinate the laser mode hop detection processes implemented by the system shown in FIG. 8. In response to detecting a laser mode hop by the measuring circuitry 814, the processor 816 can implement a corrective action, such as any of those previously described. The processor 816 can also store the laser diode current, writer heater power, and write settings in a memory 818 so as to avoid subsequent mode hops.

Figure 9:
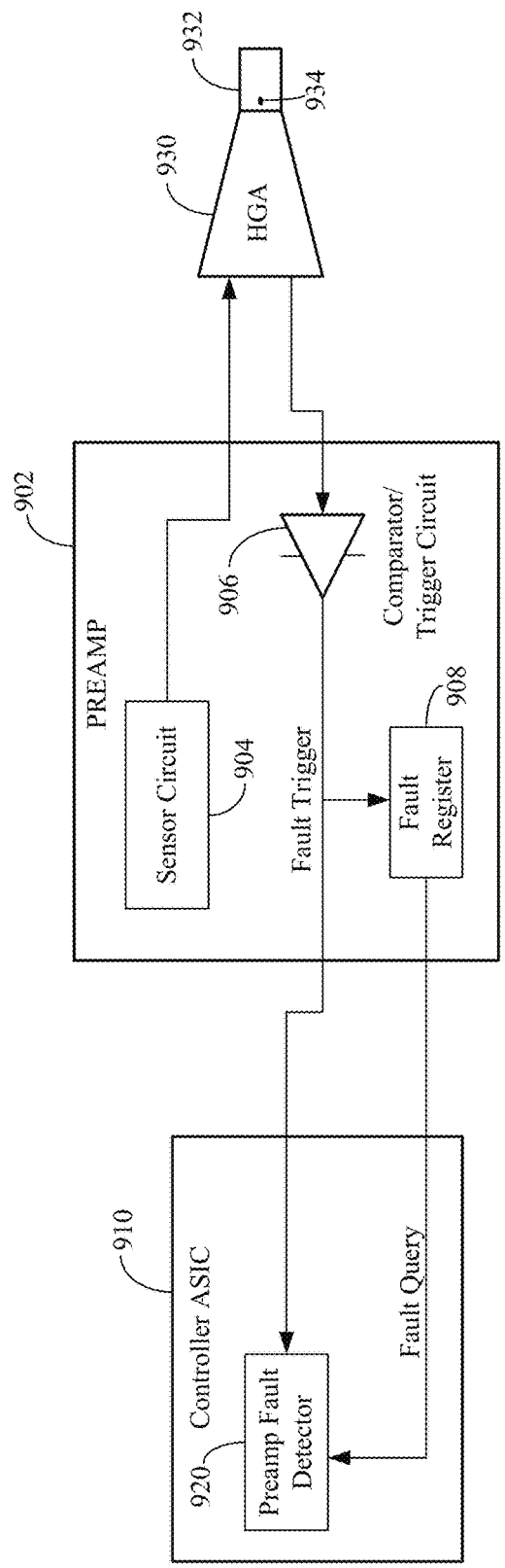
FIG. 9 illustrates representative HAMR drive architecture for implementing any of the laser mode hop detection methodologies described herein in accordance with various embodiments.

FIG. 9 illustrates representative architecture of a HAMR drive configured to implement any of the laser mode hop detection methodologies described hereinabove in accordance with various embodiments. The HAMR drive architecture shown in FIG. 9 includes a preamplifier 902 coupled to a controller ASIC (application specific integrated circuit) 910. The preamplifier 902 includes a sensor circuit 904, a comparator/trigger circuit 906, and a fault register 908. The preamplifier 902 is shown coupled to a head gimbal assembly (HGA) 930 which supports a HAMR slider 932. Among other components, the slider 932 includes a sensor 934. The sensor 934 is coupled to the sensor circuit 904 and an input of the comparator/trigger circuit 906 of the preamplifier 902. An output of the comparator/trigger circuit 906 is coupled to the fault register 908 and the preamp fault detector 920 of the controller ASIC 910.

The comparator/trigger circuit 906 serves as a threshold detector of the preamplifier 902. The comparator/trigger circuit 906 monitors the signal produced by the sensor 934 for an out of range condition relative to a predetermined threshold or threshold range. If the sensor signal is outside of the threshold or threshold range, the comparator/trigger circuit 906 triggers a preamp fault to the fault register 908 and the preamp fault detector 920 of the controller ASIC 910. In response to receiving the fault trigger, the controller ASIC 910 can immediately terminate the write operation and then query the preamp fault detector 920 to determine if the source of the fault was a "sensor out of range of expected" fault. In response to determining that the source of the fault was due to an out of range condition of the sensor signal, the controller ASIC 910 can take various forms of remedial action, such as those previously described. For example, the controller ASIC 910 can retry the write operation or reread the written data (or both). If these operations fail, controller ASIC 910 can force a fault that informs the HAMR drive of degradation in the NFT. Spurious faults can cause the system to recalibrate the sensor and/or detection thresholds.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
   while writing to a magnetic recording medium using a slider configured for heat-assisted magnetic recording:
   supplying a modulated current to a laser diode of or near the slider to produce modulated light, the modulated current having a mean amplitude that varies or is constant;
   supplying power to a writer heater of the slider, the power having a magnitude that varies or is constant;
   producing, by a sensor of the slider, a sensor signal representative of output optical power of the laser diode while writing to the medium;
   measuring a change in the sensor signal; and
   detecting a laser mode hop using the measured sensor signal change.

2. The method of claim 1, wherein:
   the modulated current has a mean amplitude that is constant; and
   the writer heater power has a magnitude that is constant.

3. The method of claim 2, wherein the change in the sensor signal is measured at a frequency of the modulated current.

4. The method of claim 2, wherein the change in the sensor signal is measured at a subharmonic of a frequency of the modulated current.

5. The method of claim 1, wherein:
   the modulated current has a mean amplitude that varies; and
   the writer heater power has a magnitude that is constant.

6. The method of claim 5, wherein the change in the sensor signal is measured at a frequency of the modulated current.

7. The method of claim 1, wherein:
   the modulated current has a mean amplitude that is constant; and
   the writer heater power has a magnitude that varies.

8. The method of claim 7, wherein the change in the sensor signal is measured at a frequency of the modulated current.

9. The method of claim 1, wherein the modulated current has a frequency between about 3 kHz and 10 MHz.

10. The method of claim 1, wherein the method is performed while writing preamble data to the medium.

11. An apparatus, comprising:
    a laser diode configured to generate modulated light during a write operation in response to receiving modulated current having a mean amplitude that varies or is constant;
    a slider configured for heat-assisted magnetic recording and to receive the modulated light;
    a writer heater of the slider configured to receive power during the write operation having a magnitude that varies or is constant;
    a sensor of the slider, the sensor configured to produce a sensor signal representative of output optical power of the laser diode during the write operation; and
    measuring circuitry coupled to the sensor and configured to measure a change in the sensor signal indicative of a laser mode hop during the write operation.

12. The apparatus of claim 11, wherein:
    the modulated current has a mean amplitude that is constant; and
    the writer heater power has a magnitude that is constant.

13. The apparatus of claim 12, wherein the measuring circuitry is configured to measure the change in the sensor signal at a frequency of the modulated current.

14. The apparatus of claim 12, wherein the measuring circuitry is configured to measure the change in the sensor signal at a subharmonic of a frequency of the modulated current.

15. The apparatus of claim 11, wherein:
    the modulated current has a mean amplitude that varies; and
    the writer heater power has a magnitude that is constant.

16. The apparatus of claim 15, wherein the measuring circuitry is configured to measure the change in the sensor signal change at a frequency of the modulated current.

17. The apparatus of claim 11, wherein:
    the modulated current has a mean amplitude that is constant; and
    the writer heater power has a magnitude that varies.

18. The apparatus of claim 17, wherein the wherein measuring circuitry is configured to measure the change in the sensor signal at a frequency of the modulated current.

19. The apparatus of claim 11, wherein the modulated current has a frequency between about 3 kHz and 10 MHz.

20. The apparatus of claim 11, wherein the write operation comprises writing preamble data to the medium.

\* \* \* \* \*